No. 799,682. PATENTED SEPT. 19, 1905.
I. D. SMELSER.
LIVE STOCK SPRAYING DEVICE.
APPLICATION FILED FEB. 11, 1905.
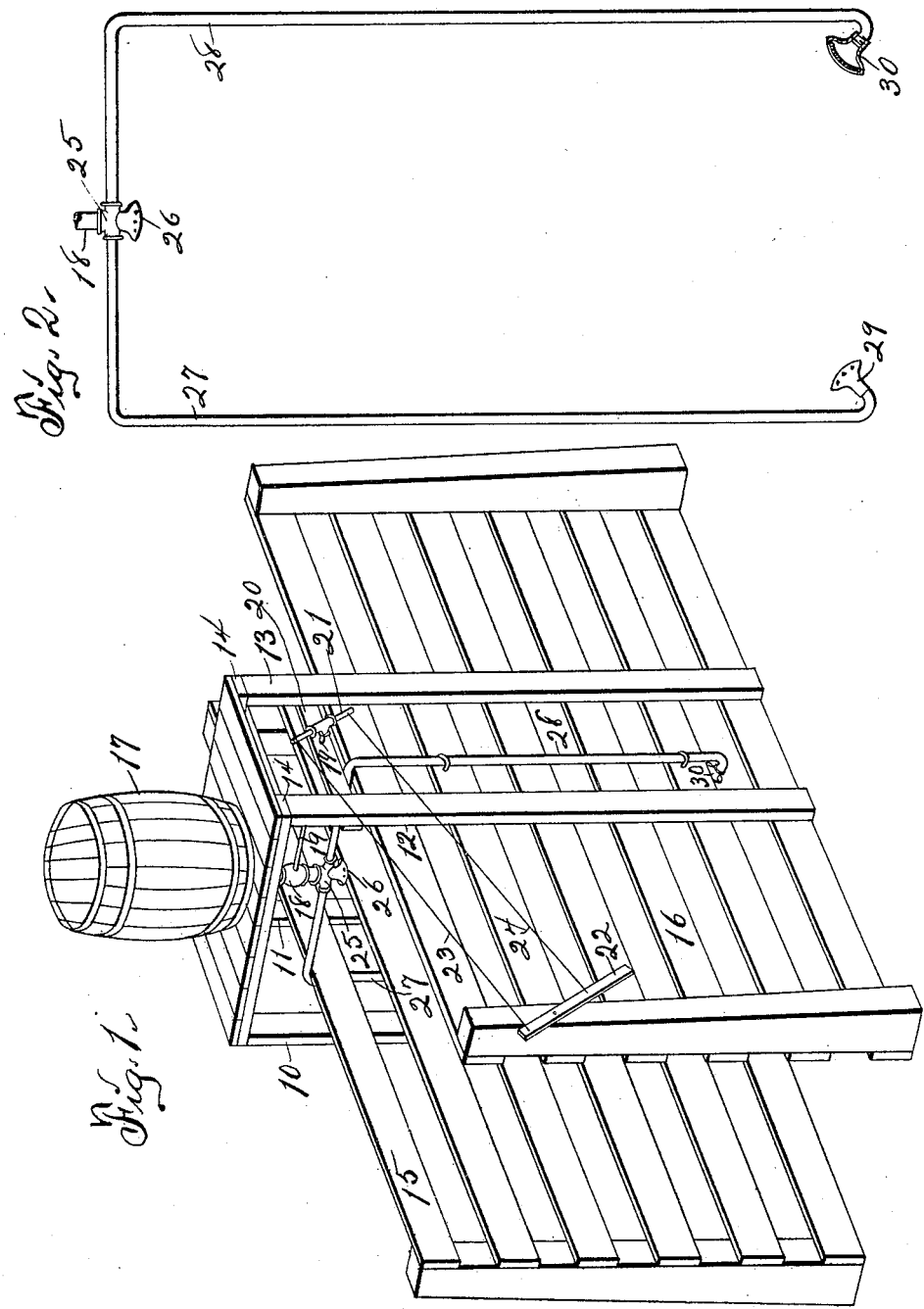
Attest:
Inventor:
Ira D. Smelser.

UNITED STATES PATENT OFFICE.

IRA D. SMELSER, OF KELLERTON, IOWA.

LIVE-STOCK-SPRAYING DEVICE.

No. 799,682.   Specification of Letters Patent.   Patented Sept. 19, 1905.

Application filed February 11, 1905. Serial No. 245,206.

*To all whom it may concern:*

Be it known that I, IRA D. SMELSER, a citizen of the United States of America, and a resident of Kellerton, Ringgold county, Iowa, have invented a new and useful Live-Stock-Spraying Device, of which the following is a specification.

The object of this invention is to provide improved means for spraying live stock.

My invention consists in the construction, arrangement, and combination of elements hereinafter set forth, pointed out in my claims, and illustrated by the accompanying drawings, in which—

Figure 1 is a perspective illustrating my complete device. Fig. 2 is a detail view of the spraying portion of the device, partly in section.

In the construction of the device, as shown, the numerals 10 11 12 13 designate vertical posts connected at their upper ends by cross-bars 14. Fences, frames, or guards 15 16 are mounted on the posts 10 11 and 12 13, respectively, opposite each other. The fences 15 16 may be parallel with each other and may converge slightly toward their forward ends. A receptacle 17 is mounted on and supported by the cross-bars 14, and a pipe 18 communicates with and extends downward from said receptacle. A valve is mounted in and controls the pipe 18, and a stem 19 extends laterally from said valve through the support 20, mounted on the posts 12 13, and is provided with a cross-head 21 on its outer end. A lever 22 is fulcrumed on the fence 16 and is connected by rods or wires 23 24 on opposite sides of its fulcrum to the opposite end portions of the cross-head 21. A cross 25 is mounted on the lower end of the pipe 18 and has lateral ports extending in opposite directions toward the fences 15 16. A rose spraying device 26 is fixed to the lowermost opening of the cross 25 and is directed downward. Pipes 27 28 communicate with the lateral ports of the cross 25 and extend toward the fences 15 16, respectively, are bent downward along said fences, and are bent inward at their lower ends from said fences. Rose spraying devices 29 30 are mounted on and communicate with the lower end portions of the pipes 27 28 and are directed obliquely upward and inward therefrom.

In practical use the receptacle 17 is supplied with any desired spraying fluid, such as a vermicide, insecticide, disinfectant, or antiseptic solution, and such fluid is discharged through the pipe 18 under the control of the valve-stem 19, manually operated through the lever 22 and its connections to the cross 25. From the cross 25 the liquid is discharged through the rose spraying devices 26, 29, and 30 against an animal being driven through the chute formed by the fences 15 16. The pipes 27 28 are imperforate, except at their ends, where they join the cross 25 and where they are supplied with the rose spraying devices 29 30. The animals may be driven in a continuous stream through the chute and the spraying solution be applied thereto continuously, or the flow of liquid may be cut on and off by an operator manipulating the lever 22.

I claim as my invention—

1. A live-stock-spraying device, comprising a chute, a forked tube partially embracing said chute, and spraying devices mounted on said forked tube and directed inward of the chute.

2. A live-stock-spraying device, comprising a forked tube, spraying devices on said tube and directed inwardly and means for supplying liquid to said forked tube.

3. A live-stock-spraying device, comprising a receptacle, a valve-controlled pipe leading from said receptacle, a forked tube on said pipe and spraying devices on said forked tube and directed inwardly.

4. A live-stock-spraying device, comprising a chute, a receptacle located above said chute, a pipe leading downward from said receptacle, a valve controlling the flow of liquid through said pipe, tubes branching from said pipe, a rose spraying device at the junction of said pipe and tubes and rose spraying devices on the opposite ends of said tubes, all of said spraying devices directed inwardly.

5. A live-stock-spraying device, comprising a chute, a forked supplying-tube partially embracing said chute and spraying devices mounted on said forked supplying-tube and directed to a common point within said chute.

6. A live-stock-spraying device, comprising a chute, a receptacle supported by said chute, a supplying-pipe leading from said receptacle, a cross on said supplying-pipe, a rose spraying device on said cross, tubes diverging from said cross to the sides of the chute, extending downward along said sides and directed inwardly and upwardly at their lower ends, rose spraying devices on said lower ends of the tubes, a valve controlling said supplying-pipe, a stem on said valve, a cross-head on said stem, a lever fulcrumed on said chute, and connections between points of the lever on opposite sides of its fulcrum and the extremities of said cross-head.

Signed by me at Kellerton, Ringgold county, Iowa, this 6th day of December, 1904.

IRA D. SMELSER.

Witnesses:
R. EMERSON,
JEANNETTE BLAIR.